(12) United States Patent
Lomsak

(10) Patent No.: US 8,882,208 B1
(45) Date of Patent: Nov. 11, 2014

(54) LUBRICATION SYSTEM

(76) Inventor: Michael J. Lomsak, Plant City, FL (US)

( * ) Notice: Subject to any disclaimer, the term of this patent is extended or adjusted under 35 U.S.C. 154(b) by 270 days.

(21) Appl. No.: 13/549,220

(22) Filed: Jul. 13, 2012

Related U.S. Application Data

(63) Continuation-in-part of application No. 13/429,024, filed on Mar. 23, 2012.

(51) Int. Cl.
*B60B 35/02* (2006.01)
*F16C 33/10* (2006.01)

(52) U.S. Cl.
USPC .......... 301/131; 301/124.1; 384/322; 384/286

(58) Field of Classification Search
USPC .............. 301/105.1, 124.1, 131–132; 384/13, 384/286, 313, 322, 462, 467, 474
See application file for complete search history.

(56) References Cited

U.S. PATENT DOCUMENTS

| | | | | |
|---|---|---|---|---|
| 4,172,620 A | * | 10/1979 | Marti | 384/474 |
| 4,784,500 A | * | 11/1988 | Prokop | 384/462 |
| 4,811,992 A | * | 3/1989 | Steiner | 301/105.1 |
| 5,174,839 A | * | 12/1992 | Schultz et al. | 152/415 |
| 5,372,434 A | * | 12/1994 | Roberts et al. | 384/391 |
| 5,611,653 A | * | 3/1997 | Smith et al. | 411/395 |
| 5,658,053 A | * | 8/1997 | Vencill et al. | 301/105.1 |
| 5,685,681 A | * | 11/1997 | Smith, II | 411/395 |
| 2003/0094849 A1 | * | 5/2003 | Joki et al. | 301/105.1 |
| 2008/0190535 A1 | * | 8/2008 | Concu | 152/416 |
| 2010/0225157 A1 | * | 9/2010 | Kirby | 301/131 |

FOREIGN PATENT DOCUMENTS

| | | | | | |
|---|---|---|---|---|---|
| EP | 0521719 | * | 2/1992 | | 301/105.1 |
| WO | WO93/07013 | * | 4/1993 | | 301/105.1 |

* cited by examiner

*Primary Examiner* — Jason Bellinger

(57) ABSTRACT

A cylindrical rotatable hub has interior and exterior cylindrical surfaces, an exterior end, a central extent, and an interior end. A fixedly positioned generally cylindrical spindle has an outer end and an enlarged annular inner end with a central extent axially between the outer and inner ends. Tapered inner and outer wheel bearings operatively couple the hub exteriorly and the spindle interiorly adjacent to the interior and exterior ends of the hub. The inner and outer wheel bearings are adapted to allow rotation of the hub with respect to the spindle. Lubricant input and output passageways extend through the inner end of the spindle.

3 Claims, 4 Drawing Sheets

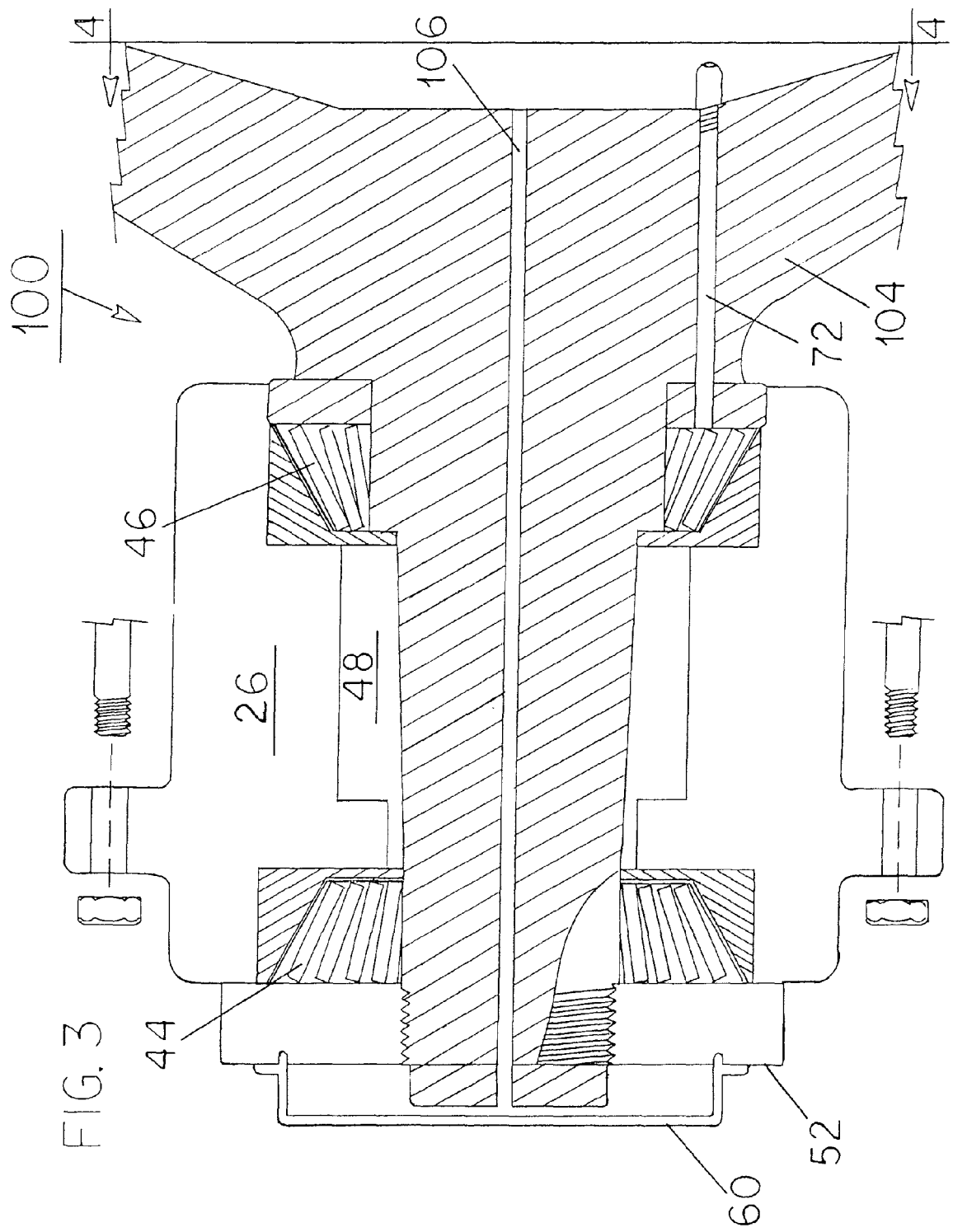

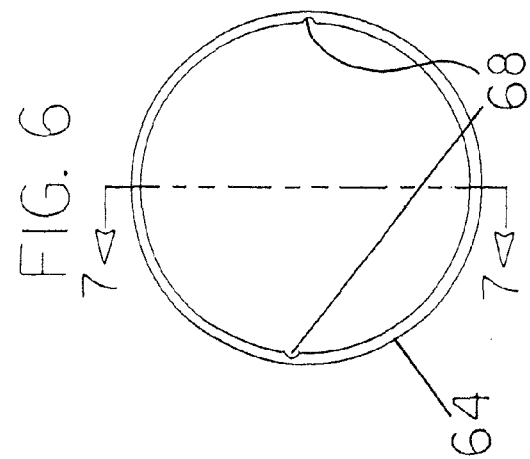
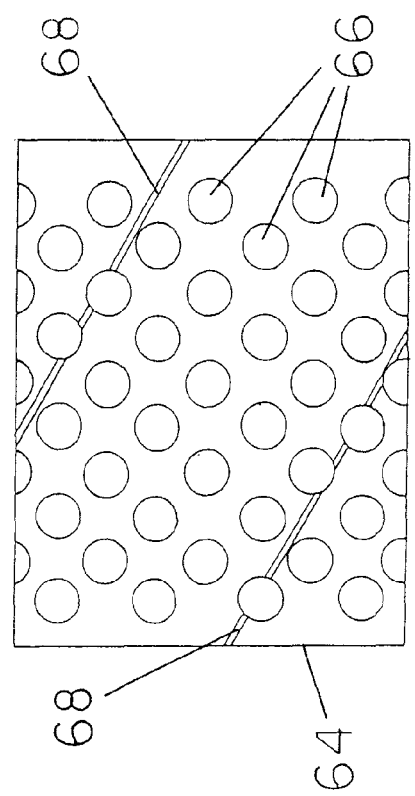
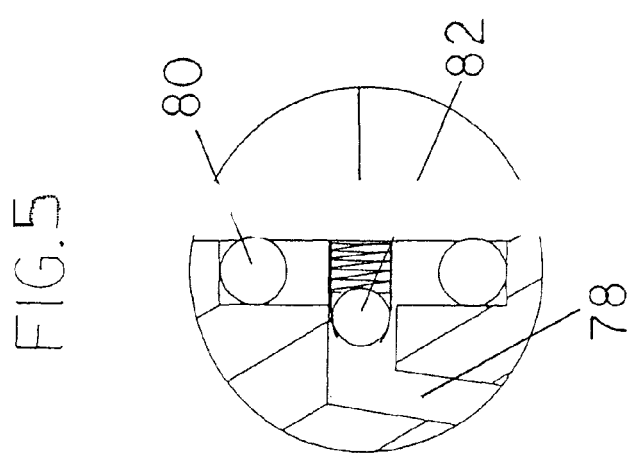

LUBRICATION SYSTEM

RELATED APPLICATION

The present application is a continuation-in-part of pending U.S. patent application Ser. No. 13/429,024 filed Mar. 23, 2012, the subject matter of which is incorporated herein by reference.

BACKGROUND OF THE INVENTION

1. Field of the Invention

The present invention relates to a lubrication system and more particularly pertains to facilitating lubrication of drive axles for a wide variety of vehicles and equipment in a safe, time saving, convenient and economical manner.

2. Description of the Prior Art

The use of lubrication systems of known designs and configurations is known in the prior art. More specifically, lubrication systems of known designs and configurations previously devised and utilized for the purpose of lubricating wheel drive axles are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a lubrication system that allows for facilitating lubrication of drive axles for a wide variety of vehicles and equipment in a safe, time saving, convenient and economical manner.

In this respect, the lubrication system according to the present invention substantially departs from the conventional concepts and designs of the prior art, and in doing so provides an apparatus primarily developed for the purpose of facilitating lubrication of drive axles for a wide variety of vehicles and equipment in a safe, time saving, convenient and economical manner.

Therefore, it can be appreciated that there exists a continuing need for a new and improved lubrication system which can be used for facilitating lubrication of drive axles for a wide variety of vehicles and equipment in a safe, time saving, convenient and economical manner. In this regard, the present invention substantially fulfills this need.

SUMMARY OF THE INVENTION

In view of the foregoing disadvantages inherent in the known types of lubrication systems of known designs and configurations now present in the prior art, the present invention provides an improved lubrication system. As such, the general purpose of the present invention, which will be described subsequently in greater detail, is to provide a new and improved lubrication system and method which has all the advantages of the prior art and none of the disadvantages.

To attain this, the present invention essentially comprises a lubrication system wherein a cylindrical rotatable hub has interior and exterior cylindrical surfaces, an exterior end, a central extent, and an interior end. A fixedly positioned generally cylindrical spindle has an outer end and an enlarged annular inner end with a central extent axially between the outer and inner ends. Tapered inner and outer wheel bearings operatively couple the hub exteriorly and the spindle interiorly adjacent to the interior and exterior ends of the hub. The inner and outer wheel bearings are adapted to allow rotation of the hub with respect to the spindle. Lubricant input and output passageways extend through the inner end of the spindle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lubrication system which has all of the advantages of the prior art lubrication systems of known designs and configurations and none of the disadvantages.

It is another object of the present invention to provide a new and improved lubrication system which may be easily and efficiently manufactured and marketed.

It is further object of the present invention to provide a new and improved lubrication system which is of durable and reliable constructions.

An even further object of the present invention is to provide a new and improved lubrication system which is susceptible of a low cost of manufacture with regard to both materials and labor, and which accordingly is then susceptible of low prices of sale to the consuming public, thereby making such lubrication system economically available to the buying public.

Lastly, it is an object of the present invention to provide a new and improved lubrication system for a wide variety of vehicles and equipment which facilitates lubricating in a safe, time saving, convenient and economical manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view similar to FIG. 1 but illustrating an alternate embodiment of the invention.

FIG. 5 is an enlarged illustration of the one way valve taken at Circle 5 of FIG. 1.

FIG. 6 is an end view of the sleeve bearing illustrated in FIG. 1.

FIG. 7 is a cross sectional view taken along line 7-7 of FIG. 6.

The same reference numerals refer to the same parts throughout the various Figures.

DESCRIPTION OF THE PREFERRED EMBODIMENT

Figure 1:
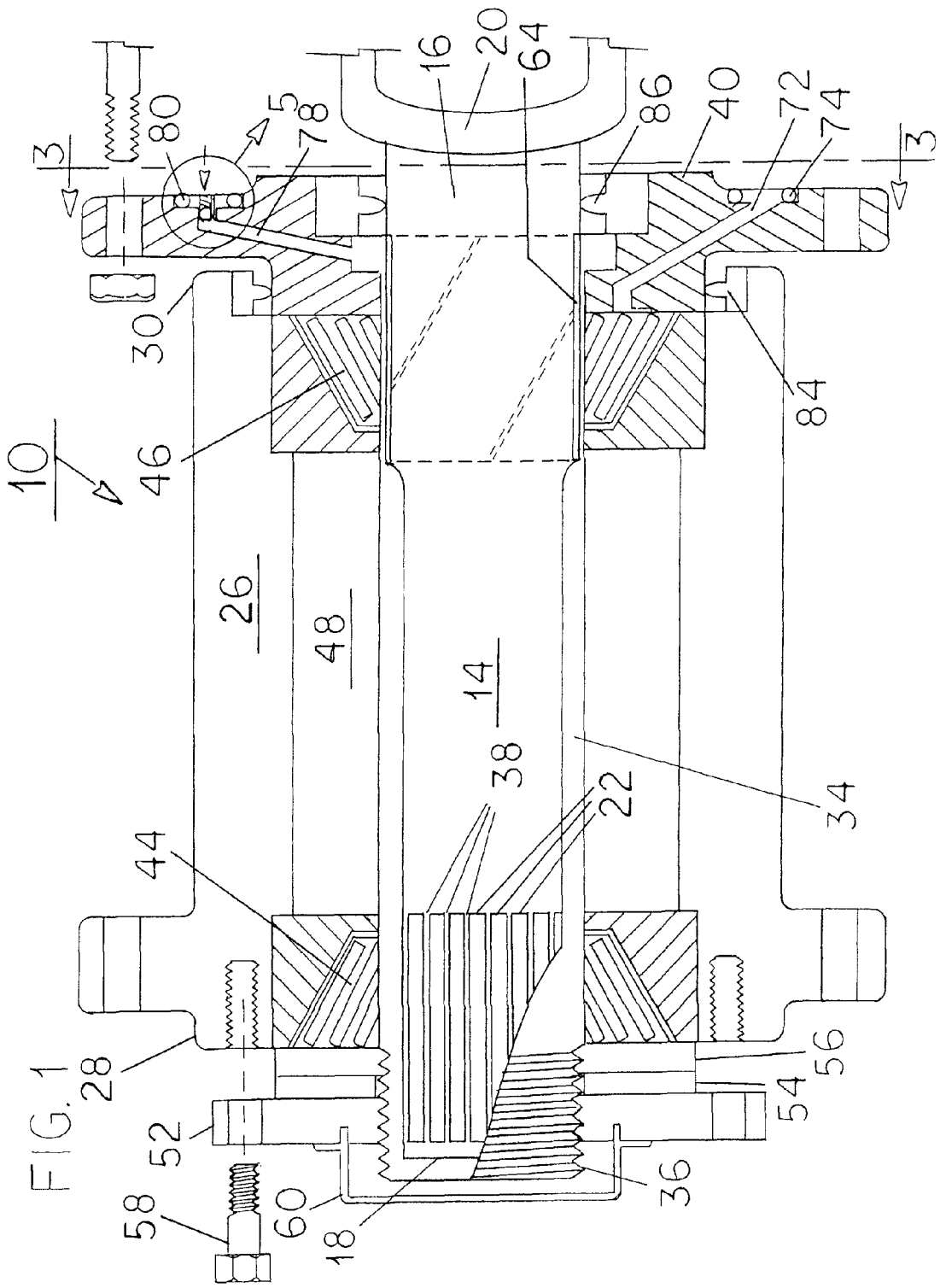
FIG. 1 is a cross sectional view taken longitudinally along the axis of a lubrication system constructed in accordance with the principles of the present invention.

With reference now to the drawings, and in particular to FIG. 1 thereof, the preferred embodiment of the new and improved lubrication system embodying the principles and concepts of the present invention and generally designated by the reference numeral 10 will be described.

The present invention, the lubrication system 10 is comprised of a plurality of components. Such components in their broadest context include a rotatable hub, a fixedly positioned spindle, tapered inner and outer wheel bearings, and lubricant input and output passageways. Such components are individually configured and correlated with respect to each other so as to attain the desired objective.

The preferred embodiment of the invention is a front wheel drive axle lubrication system 10 for a wide variety of vehicles and equipment. The system is adapted to facilitate lubricating in a safe, time saving, convenient and economical manner. First provided is a rotatable axle 14. The axle has a generally cylindrical configuration with an inner end 16 and an outer end 18. The axle has a central axis in a generally horizontal orientation. The inner end of the axle has a yoke 20. The outer end of the axle has splines 22. The axle has a central extent between its inner and outer ends. The majority of the axial length of the central extent is of a common diameter.

Next provided is a rotatable hub 26. The hub is in a cylindrical configuration. The hub encompasses the axle and has an interior cylindrical surface and an exterior cylindrical surface. The hub is co-axial with the central axis of the axle. The hub has an exterior end 28 located axially inwardly of the outer end of the axle. The hub having an interior end 30 located axially outwardly of the inner end of the axle. The hub has a central extent axially between its interior and exterior ends.

A fixedly positioned spindle 34 is next provided. The spindle is in a generally cylindrical configuration. The spindle has an outer closed end 36 with exterior threads 36 and interior splines 38 receiving the splines of the axle. The spindle has an enlarged annular inner open end 40 encompassing the inner end of the axle. The spindle has a central extent axially between its open and closed ends.

Next provided is a tapered outer roller bearing 44. The tapered outer roller bearing operatively couples the hub exteriorly and the spindle interiorly adjacent to the exterior end of the hub. A tapered inner roller bearing 46 is provided. The tapered inner roller bearing operatively couples the hub exteriorly and the spindle interiorly adjacent to the interior end of the hub. The inner and outer tapered roller bearings are adapted to allow rotation of the hub with respect to the spindle. An annular space 48 is bounded axially by the tapered inner and outer roller bearings and radially by the hub and the spindle.

A plurality of washers 52, 54, 56 are coupled to the threaded end of the spindle. The washers include an end washer 52 and two intermediate washers 54, 56. A threaded fastener 58 couples the end washer to the hub. A grease cap 60 coupled to the end washer covers the threaded end of the axle.

Next provided is a cylindrical sleeve bearing 64. The sleeve bearing is between the spindle and the axle radially interiorly of the tapered inner roller bearing. The sleeve bearing has holes 66 and off-axis grooves 68 for the dissemination of lubricant.

Next provided is a lubricant input passageway 72. The input passageway extends through the inner open end of the spindle. The input passageway has an entrance end with a recess and an O-ring 74 for coupling with a fitting to pump lubricant. The input passageway has an exit end at the tapered inner roller bearing.

A lubricant output passageway 78 is next provided. The output passageway extends through the inner open end of the spindle. The output passageway has an exit end with a recess and an O-ring 80. The output passageway has an entrance end adjacent to the tapered inner roller bearing. The exit end of the output passageway has a check valve 82 at a location diametrically opposed to the entrance end of the input passageway.

Next provided is a first seal 84 between the hub and the spindle. Also provided is a second seal 86 between the spindle and the axle. The first and second seals are adapted to preclude passage of lubricant from the system other than through the outlet passageway.

Lastly, a lubricant is provided. The lubricant is adapted to be pumped into the entrance end of the input passageway, then into the tapered inner roller bearing, then into the tapered outer roller bearing, then into the output passageway and then to exterior of the system. Note is taken that the flow of lubricant may be in the opposite direction from that as above described.

Figure 4:
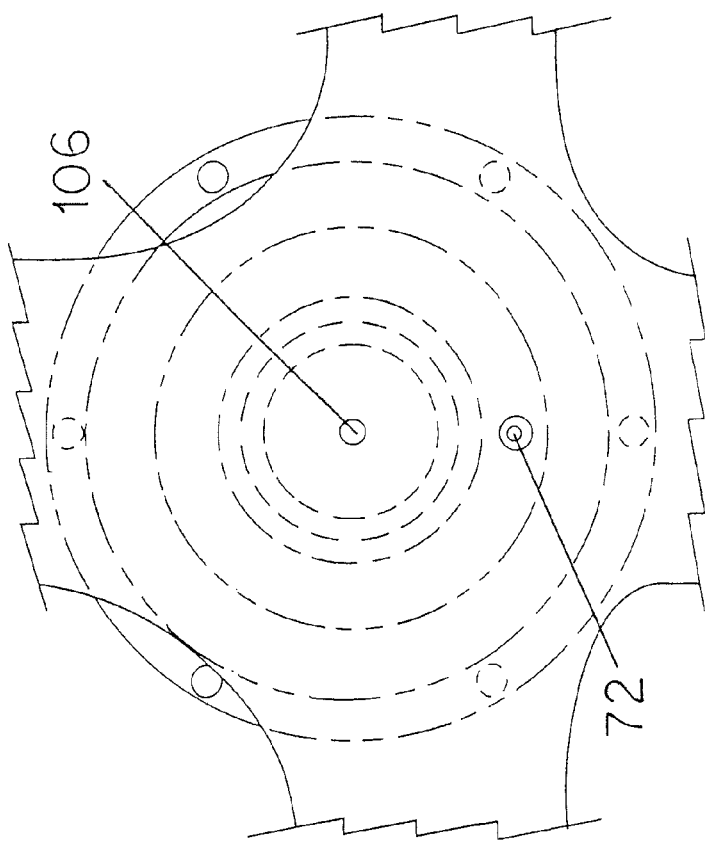
FIG. 4 is an end view taken along line 4-4 of FIG. 3.
Figure 2:
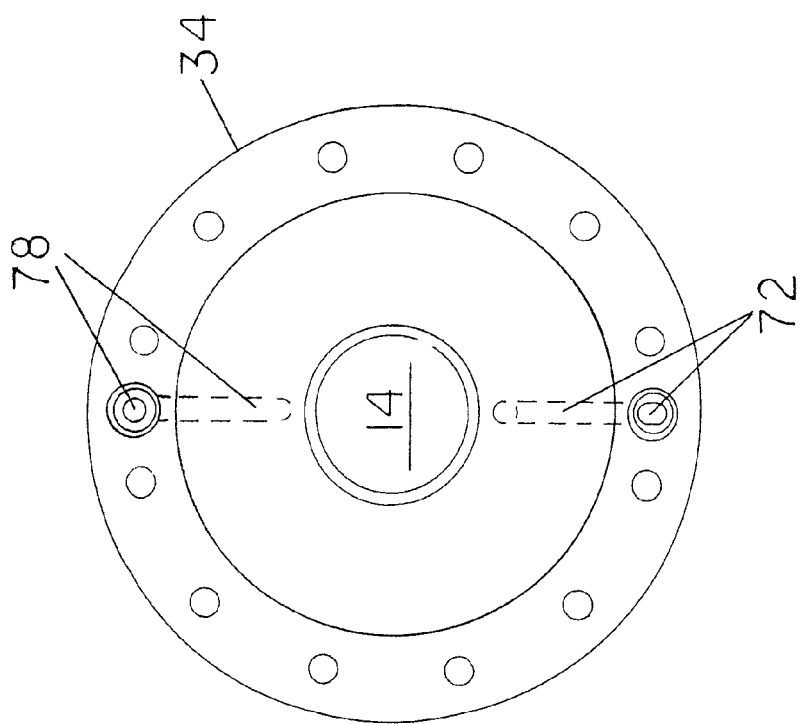
FIG. 2 is an end view taken along line 2-2 of FIG. 1.

An alternate embodiment of the system 100 of the invention is shown in FIGS. 3 and 4. In this embodiment, the system is adapted for rear wheel drive vehicles and for small trucks. In this embodiment, the spindle 104 has a central bore hole 106 adapted to function as one of the lubricant passageways.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lubrication system comprising:
   a rotatable hub having a cylindrical configuration with interior and exterior cylindrical surfaces, the hub having an exterior end and an interior end and a central extent;
   a fixedly positioned spindle in a generally cylindrical configuration, the spindle having an outer end and an enlarged annular inner end, the spindle having a central extent axially between the outer and inner ends;
   tapered inner and outer wheel bearings operatively coupling the hub exteriorly and the spindle interiorly adjacent to the interior and exterior ends of the hub, the inner and outer wheel bearings adapted to allow rotation of the hub with respect to the spindle,
   lubricant input and output passageways extending through the inner end of the spindle and through the inner and outer wheel bearings;
   a pressure relief valve (82) located within the output passageway; and
   an axle interiorly of the spindle and rotatable with the hub, the system adapted for front wheel drive vehicles and for a variety of other vehicles and equipment.

2. A lubrication system comprising:
   a rotatable hub having a cylindrical configuration with interior and exterior cylindrical surfaces, the hub having an exterior end and an interior end and a central extent;
   a fixedly positioned spindle in a generally cylindrical configuration, the spindle having an outer end and an enlarged annular inner end, the spindle having a central extent axially between the outer and inner ends;
   tapered inner and outer wheel bearings operatively coupling the hub exteriorly and the spindle interiorly adjacent to the interior and exterior ends of the hub, the inner and outer wheel bearings adapted to allow rotation of the hub with respect to the spindle; and
   lubricant input and output passageways extending through the inner end of the spindle and through the inner and outer wheel bearings;
   wherein the spindle (104) has a central bore hole (106) adapted to function as one of the lubricant passageways; and
   wherein the system is adapted for rear wheel drive vehicles and for small trucks.

3. A front wheel drive axle lubrication system (10) for a variety of vehicles and equipment, the system adapted to facilitate lubricating, the system comprising, in combination:
   a rotatable axle (14) having a generally cylindrical configuration with an inner end (16) and an outer end (18), the axle having a central axis in a generally horizontal orientation, the inner end of the axle having a yoke (20), the outer end of the axle having splines (22), the axle having a central extent between the inner and outer ends with the majority of the axial length of the central extent being of a common diameter;
   a rotatable hub (26) having cylindrical configuration encompassing the axle with an interior cylindrical surface and an exterior cylindrical surface, the hub being co-axial with the central axis of the axle, the hub having an exterior end (28) located axially inwardly of the outer end of the axle, the hub having an interior end (30) located axially outwardly of the inner end of the axle, the hub having a central extent axially between the interior and exterior ends;
   a fixedly positioned spindle (34) in a generally cylindrical configuration, the spindle having an outer closed end (36) with exterior threads (36) and interior splines (38) receiving the splines of the axle, the spindle having an enlarged annular inner open end (40) encompassing the inner end of the axle, the spindle having a central extent axially between the open and closed ends;
   a tapered outer roller bearing (44) operatively coupling the hub exteriorly and the spindle interiorly adjacent to the exterior end of the hub, a tapered inner roller bearing (46) operatively coupling the hub exteriorly and the spindle interiorly adjacent to the interior end of the hub, the inner and outer roller bearings adapted to allow rotation of the hub with respect to the spindle, an annular space (48) bounded axially by inner and outer roller bearings, the annular space being bounded radially by the hub and the spindle;
   a plurality of washers (52) (54) (56) coupled to the threaded end of the spindle, the washers including an end washer (52) and two intermediate washers (54) (56), a threaded fastener (58) coupling the end washer to the hub, a grease cap (60) coupled to the end washer covering the threaded end of the axle;
   a cylindrical sleeve bearing (64) between the spindle and the axle radially interiorly of the inner tapered roller bearing, the sleeve bearing having holes (66) and off-axis grooves (68) for the dissemination of lubricant;
   a lubricant input passageway (72) extending through the inner open end of the spindle, the input passageway having an entrance end with a recess and an O-ring (74) for coupling with a fitting to pump lubricant, the input passageway having an exit end at the tapered inner roller bearing;
   a lubricant output passageway (78) extending through the inner open end of the spindle, the output passageway having an exit end with a recess and an O-ring (80), the output passageway having an entrance end adjacent to the tapered inner roller bearing, the exit end of the output passageway having a check valve (82) at a location diametrically opposed to the entrance end of the input passageway;
   a first seal (84) between the hub and the spindle, a second seal (86) between the spindle and the axle, the first and second seals adapted to preclude passage of lubricant from the system other than through the outlet passageway; and
   a lubricant adapted to be pumped into the entrance end of the input passageway, then into the tapered inner roller bearing, then into the tapered outer roller bearing, then into the output passageway and then to exterior of the system.

* * * * *